Nov. 4, 1930.  W. McKEE  1,780,493
CONVEYER AND CONVEYER ROLLER
Filed Sept. 17, 1927
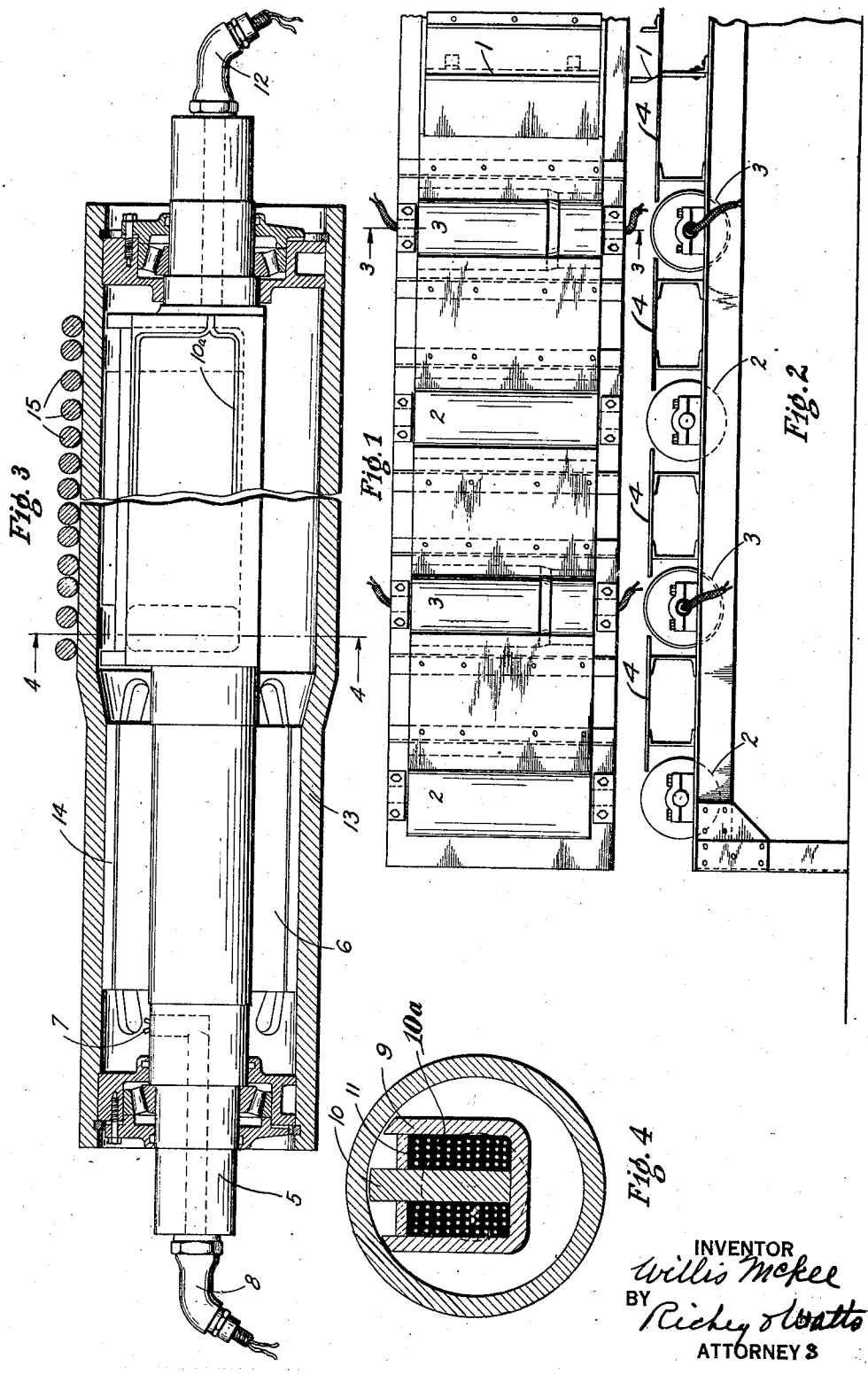
INVENTOR
Willis McKee
BY
Richey & Watts
ATTORNEYS Patented Nov. 4, 1930

1,780,493

UNITED STATES PATENT OFFICE

WILLIS McKEE, OF CLEVELAND, OHIO, ASSIGNOR TO THE CENTRAL UNITED NATIONAL BANK, A CORPORATION OF OHIO

CONVEYER AND CONVEYER ROLLER

Application filed September 17, 1927. Serial No. 220,111.

This invention relates to conveyers more particularly for use in handling magnetic articles and the like. It also relates to rollers for use in such conveyers.

Heretofore conveyers for magnetic articles have possessed numerous disadvantages. Line shafts extending for the length of the conveyer with gearing for the individual rollers or some of them have been provided which are costly to install and require constant maintenance and realignment. In cooling beds these rollers have had to be of large diameter to bring the line shaft far enough to clear other parts of the cooling beds and thereby avoid interference therewith. Moreover the rollers do not feed articles evenly and are incapable of positively feeding many bent or short articles up against a stop as is often desirable for example in cooling beds in front of shears.

Accordingly my invention is directed to the construction of a conveyer which may be inexpensively constructed, will not require any long line shafts or associated gearing or large diameter rollers, will require little or no maintenance or realignment but which will positively feed all articles evenly up to a stop if desired and without harmful slippage on the rollers.

My invention is further directed to a new and improved conveyer roller, which may be employed in such conveyers, and in which is combined means for positively driving the roller and for magnetically conveying magnetic articles on the roller.

For the accomplishment of these and other related objects of my invention I have chosen to describe in this specification one form of apparatus embodying my invention, reference being had to the drawings which accompany and form a part of this specification and in which—

Figure 1 is a top plan view of a conveyer equipped with my improved rollers,

Figure 2 is a side elevation of the conveyer of Figure 1,

Figure 3 is a transverse sectional view taken on line 3—3 of Figure 1. Figure 4 is a section on line 4—4 of Fig. 3.

Referring first to Figure 1 my improved conveyer comprises a plurality of rollers suitably supported so that the tops thereof are in substantial alignment. In the illustrated conveyer, reference character 1 designates fragmentarily a cut-off in the shape of shears and 2 and 3 designates rollers of the conveyer, rollers 2 being idlers and roller 3 being driven. I preferably provide a driven roller 3 adjacent to the shear 1 and then place one or more idlers, 2, between the first driven roller 3 and the next driven roller 3 in the conveyer. Thereafter a plurality, for example, five idler rollers may be interposed between each two driven rollers. The usual aprons 4 are provided between the rollers. The driven rollers, as will more clearly appear from the following description of Figures 2 and 3, are provided with electrical means for driving the same, and thus the usual line shaft and gearing required in conveyers of the prior art is eliminated. Consequently there is no gearing or the like to interfere with shuffle bars or other parts of the conveyer or a cooling bed and the diameter of the rollers may be as small as is desired or practicable. I preferably make the diameters of the rollers less than once or twice the length of the shortest article to be conveyed by the rollers.

Because of the increased traction force of a magnetic roller such a conveyer will feed all articles evenly regardless of length and bring all of them up against any stops, such for example as that customarily provided in connection with a shear where it is desired to move the articles to be cut up against the stop beyond the shear blades so as to have the articles cut-off all to the same length.

I do not consider the foregoing arrangement of rollers as the only arrangement which can be made since obviously, under various conditions, the grouping or arrangement of idler and driven rollers may be altered. For example, all of the driven rollers may be bunched together near the shears or some of the driven rollers may be placed at each end of the conveyer with all of the idler rollers grouped in between.

It will be understood from the foregoing, however, that I have provided a conveyer which is extremely cheap and simple to build, which requires practically no maintenance or realignment, which dispenses with line shafting and gearing and in which the diameter of the rollers may be much less than has been possible heretofore where line shafting and gear drives were required.

Referring now to Figures 2 and 3 in which I have illustrated a roller which may be used as the driven rollers 3 of the foregoing conveyer reference numeral 5 designates a roller shaft which is fixed against rotational movement and suitably supported at the ends. This shaft is provided intermediate its ends with the stator element 6 of a motor, the electrical leads 7 from the wiring of which extend into the shaft 5 and are conducted into a suitable aperture extending longitudinally of the shaft out through the end thereof and through a fitting 8 and thence to a suitable source of electrical energy. Shaft 5 also carries intermediate its ends an electro-magnet made up of a pole piece 9 in the form of a rectangular hollow box and a second pole piece 10 in the form of a partition extending longitudinally of the shaft within the box-like pole piece 9. 10ª indicates electrical windings around the pole piece 9 and 11 designates a suitable cover for the windings to protect the same and held in place in any desired manner. Leads from the windings 10ª pass through an aperture extending longitudinally of the shaft 5, out through fitting 12 and thence to a suitable source of direct current energy. A non-magnetic shell 13 preferably composed of manganese steel, although other suitable material may be used, is positioned about the shaft 5 for rotation relative thereto. and is supported on the shaft by suitable bearings disposed adjacent to each end of the shell outside of the motor and magnet and carried by the shaft 5. The shell 13 carries the rotor parts 14 which in conjunction with the stator parts 6, about which they are disposed, constitute an electric motor which when supplied with electrical current through the leads 7 is adapted to rotate the cylinder 13 on the shaft 5. With this shaft rotated by means of this motor, articles may be conveyed by the roller due to the friction developed between the articles and roller but when direct current is brought into the shaft 5 through fitting 12 and energizes the magnet including the pole pieces 9 and 10 there is set up a magnetic action between the magnet and the articles on the shell 13 thereabove which adds a pull on the articles in addition to that of the force of gravity thereby increasing the frictional or tractive force between the roller shell 13 and the article thereon. Magnetic articles 15 or the like may in this manner be transported by the roller 13 positively and with sufficient power to move the same over idle rollers on either or both sides of a driven roller.

Having thus described my invention so that those skilled in the art may be enabled to practice the same what I desire to secure by Letters Patent is defined in what is claimed.

I claim:

1. A conveyer for magnetic articles comprising a plurality of rollers, means for rotatably supporting said rollers, certain of said rollers being driven, and electrical means in the driven rollers for rotating the same and including winding for magnetically attracting magnetic articles on said last rollers.

2. A conveyer for magnetic articles comprising a plurality of rollers, means for rotatably supporting said rollers, certain of said rollers being driven, and electrical means housed within each driven roller for rotating the roller, and other electrical means for increasing the tractive force of magnetic articles on said conveyer.

3. A conveyer roller comprising an axle, a non-magnetic shell rotatable relative thereto, means within said shell for electrically rotating said shell and means for magnetically attracting magnetic articles on the shell.

4. A conveyer roller comprising a non-magnetic, rotatable shell, a non-rotatable axle for the said shell, and electrical means associated with the axle and within the shell for rotating the shell and including winding for exerting magnetic force on magnetic articles on the shell.

5. A conveyer roller comprising a rotatable shell, a non-rotatable axle for the shell, electrical means carried within the shell for rotating the shell, and electrical means within the shell and associated with the axle for exerting magnetic force on magnetic articles on the shell.

6. A conveyer roller comprising a non-rotatable axle, an electro-magnet carried by the axle, a non-magnetic shell rotatably supported on the axle and housing the electromagnet, and an electric motor for driving the shell and housed within the said shell.

7. A conveyer roller comprising a non-rotatable axle, a motor stator and an electro-magnet carried by the axle, and a roller shell rotatably supported on the axle and carrying a motor rotor, the shell housing the electro-magnet and being composed of non-magnetic material.

8. A conveyer roller comprising a non-rotatable shaft, an electro-magnet and a motor stator carried by the shaft, a non-magnetic shell rotatably supported on bearings on said shaft and carrying a motor rotor, and leads for the magnet and motor extending longitudinally within the shaft out of contact with the rotatable part of said bearings.

9. A conveyer roller having a non-rotatable shaft, a shell rotatable relative thereto, a motor within said shell for rotating the shell, and means within said shell for increasing the traction of magnetic articles on the shell in addition to the traction due to gravity.

10. A conveyer roller comprising a nonmagnetic, rotatable shell journalled on a nonrotating shaft, means disposed between said journals and within the shell for rotating said shell, and means also disposed between such journals for magnetically attracting magnetic material to the said shell.

11. A conveyer roller comprising a non-rotatable shaft carrying bearings spaced thereon, a motor stator mounted on the shaft between the said bearings, magnetic means comprising a plurality of poles carried by the shaft between the said bearings, and a nonmagnetic shell rotatably disposed about the shaft, stator and magnetic means and supported on the said bearings, the said shell carrying a motor rotor in radial alignment with the said stator.

In testimony whereof I hereunto affix my signature this 22nd day of August, 1927.

WILLIS McKEE.